United States Patent [19]

Neil

[11] Patent Number: 4,696,778
[45] Date of Patent: Sep. 29, 1987

[54] PROCESS FOR SINTERING SILICON NITRIDE ARTICLES

[75] Inventor: Jeffrey T. Neil, Pepperell, Mass.

[73] Assignee: GTE Laboratories Incorporated, Waltham, Mass.

[21] Appl. No.: 824,754

[22] Filed: Jan. 31, 1986

[51] Int. Cl.$^4$ ............................................. C04B 35/64
[52] U.S. Cl. ...................................... 264/65; 264/66
[58] Field of Search .................................... 264/65, 56

[56] References Cited

U.S. PATENT DOCUMENTS

| | | | |
|---|---|---|---|
| 4,073,845 | 2/1978 | Buljan et al. | 264/65 |
| 4,101,616 | 7/1978 | Buljan | 264/65 |
| 4,179,301 | 12/1979 | Buljan | 106/73.5 |
| 4,280,850 | 7/1981 | Smith et al. | 106/73.2 |
| 4,350,771 | 9/1982 | Smith | 501/97 |
| 4,354,990 | 10/1982 | Martinengo et al. | 264/65 |
| 4,356,136 | 10/1982 | Mangels | 264/65 |
| 4,376,652 | 3/1983 | Buljan | 501/97 |
| 4,379,110 | 4/1983 | Greskovich et al. | 264/65 |
| 4,383,958 | 5/1983 | Moschetti et al. | 264/65 |
| 4,400,427 | 8/1983 | Moschetti et al. | 428/332 |
| 4,449,989 | 5/1984 | Sarin et al. | 51/295 |

*Primary Examiner*—James Derrington
*Attorney, Agent, or Firm*—Ivan L. Ericson

[57] ABSTRACT

A process for sintering silicon nitride articles to a density greater than 98% of theoretical density comprises the steps of heating a silicon nitride article in a covered container to a temperature equal to or greater than the liquidus temperature of the sintering aids contained in the silicon nitride article in a protective atmosphere and at a pressure for a period of time sufficient to obtain a density greater than 98% of theoretical density. The pressure is changed during the sintering step to displace the protective atmosphere in the closed container.

6 Claims, No Drawings

PROCESS FOR SINTERING SILICON NITRIDE ARTICLES

The Government has rights in this invention pursuant to Contract No. DASG60-84-C-0006 awarded by the Department of the Army.

FIELD OF THE INVENTION

This invention relates to a process for making ceramic articles. More particularly, it relates to a process for sintering silicon nitride articles.

BACKGROUND OF THE INVENTION

On a laboratory scale silicon nitride based ceramics containing sintering aids such as MgO, $Y_2O_3$, $Al_2O_3$, $ZrO_2$, $HfO_2$, $CeO_2$ and $La_2O_3$ have been sintered to densities above 98% of theoretical density. When the sintering process has been upscaled for sintering large quantities of injection molded, isostatically pressed, or slip cast components of silicon nitride based compositions such as ($Si_3N_4+6$ wt% $Y_2O_3+2$ wt% $Al_2O_3$), final sintered densities often fall below the desired 98% level.

It has been noted that the larger the number of silicon nitride parts sintered simultaneously in a closed sintering container, the greater the decrease in density. Studies of this effect have also demonstrated that parts placed towards the middle of the container tend to have both lower sintered density and lower weight loss during the sintering process (weight losses usually range from 0.5 to 2 w/o). Also noted has been a slight color change on the component surfaces where two components are physically close but not touching. These observations have led to the theory that during the sintering process gaseous species are generated from the parts which, if allowed to collect in the closed container, tend to inhibit sintering. The larger the amount of silicon nitride being sintered in a given container volume, the greater the collection of the sintering inhibitor and the lower the resultant densities. An ideal solution would be to use an open container instead of a closed one but this leads to accelerated $Si_3N_4$ decomposition.

SUMMARY OF THE INVENTION

In accordance with one aspect of the present invention, a new and improved process for sintering a silicon nitride article containing sintering aids to a density greater than 98% of theoretical comprises the following steps:

(1) A silicon nitride article in a covered container is heated in a protective atmosphere under a pressure to a temperature equal to or greater than the liquidus temperature of the sintering aids contained in the silicon nitride article.

(2) The article from step (1) is sintered at the temperature obtained from step (1) for a period sufficient to obtain a density equal to or greater than 98% of theoretical density in a protective atmosphere at a pressure to form a sintered silicon nitride article.

(3) The pressure of step (2) is changed sufficiently to displace greater than one quarter by volume of the protective atmosphere contained in the covered container. The minimum pressure during the pressure change is sufficient to minimize weight loss of the silicon nitride article during the period of sintering in step (2).

(4) The product from step (3) is cooled to room temperature and the pressure is reduced to atmospheric.

In accordance with another aspect of the present invention, a new and improved process for sintering a silicon nitride article containing sintering aids to a density greater than 98% of theoretical comprises the following steps:

(1) A silicon nitride article in a covered container is heated in a protective atmosphere under a pressure to a temperature equal to or greater than the liquidus temperature of the sintering aids contained in the silicon nitride article.

(2) The article from step (1) is sintered at the temperature obtained from step (1) for a period sufficient to obtain a density equal to or greater than 98% of theoretical density in a protective atmosphere at a pressure to form a sintered silicon nitride article.

(3) Greater than one quarter by volume of the protective atmosphere contained in the covered container is displaced.

(4) A minimum pressure is maintained during the sintering in step (2) sufficient to minimize weight loss of the silicon nitride article during the period of sintering in step (2).

(5) The product from step (4) is cooled to room temperature and the pressure is reduced to atmospheric.

DETAILED DESCRIPTION OF THE INVENTION

For a better understanding of the present invention, together with other and further objects, advantages and capabilities thereof, reference is made to the following disclosure and appended claims.

The sintering of silicon nitride containing sintering aids such as MgO, $Y_2O_3$, $Al_2O_3$, $ZrO_2$, $HfO_2$, $CeO_2$ and $La_2O_3$ preferably 6 w/o yttria and 2 w/o alumina hereafter designated as AY6 is accomplished at elevated nitrogen pressures to reduce silicon nitride decomposition. The present invention uses a short duration pressure drop while at the sintering temperatures to displace some fraction of the gas in the covered container into the furnace atmosphere. This is followed by immediate repressurization thereby effectively purging the gas in the covered container while keeping a sufficient overpressure for the majority of time at temperature to avoid decomposition. The process can be repeated several times during the sintering cycle to insure the covered container is vented. The selection of the lower vent pressure was made to provide the minimum pressure possible and still have a reasonable degree of protection from decomposition. For AY6 articles sintered at 1870° C. and 200 psig gas pressure, a lower gas pressure of 50 psig was selected where the gas is a protective atmosphere such as nitrogen. With this ratio of pressure (and assuming ideal gas behavior) each 200 to 50 psi vent cycle, change of pressure cycle, would remove slightly over ¾ of the atmosphere in the covered container. However, vent cycles having smaller pressure changes can be used whereby ¼ of the atmosphere in the covered container is removed per cycle and many cycles can be made.

The previous sintering practice and benefits of the present invention are shown in a series of three sintering runs of slip cast AY6 samples from the same powder lot and prepared for sintering in an identical manner.

In run number W5979-20 three samples totaling 181.5 grams were put in a covered graphite boat having internal volume of 1.7 liters and sintered at 1870° C. for 3 hours at a constant nitrogen pressure of 200 psig. The results shown in Table I show good densities and an acceptable level of weight loss on sintering. These results are very representative of samples fired in boats not heavily filled.

TABLE I

RESULTS OF SINTERING RUN W5979-20

| Sample Number | Sintered Density (gm/cc) | % TD* | Weight Loss % |
|---|---|---|---|
| 1 | 3.23 | 99.1 | 2.08 |
| 12 | 3.23 | 99.1 | 1.59 |
| 23 | 3.23 | 99.1 | 1.77 |

*Theoretical density by rule-of-mixtures is 3.26 gm/cc.

A second run, number W5979-23, used the same sintering cycle of 1870° C. for 3 hours at 200 psig of nitrogen pressure. In this run the boat having same internal volume as run number W5979-20 contained 11 samples of AY6 totaling 714 grams. As shown in Table II the resultant densities and weight losses show the reduced levels characteristic of a fully loaded boat.

TABLE II

RESULTS OF SINTERING RUN W5979-23

| Sample Number | Sintered Density (gm/cc) | % TD* | Weight Loss % |
|---|---|---|---|
| 13 | 3.187 | 97.7 | 3.17 |
| 3 | 3.17 | 97.2 | .70 |
| 64 | 3.19 | 97.7 | .57 |
| 65 | 3.182 | 97.6 | .55 |
| 66 | 3.182 | 97.5 | .56 |
| 67 | 3.213 | 98.5 | .48 |
| 68 | 3.168 | 97.1 | .46 |
| 69 | 3.181 | 97.5 | .53 |
| 70 | 3.181 | 97.5 | .51 |
| 71 | 3.199 | 98.1 | .65 |
| 72 | 3.218 | 98.6 | .89 |

*Theoretical density by rule-of-mixtures is 3.26 gm/cc.

The third sintering run in the series, number W6027-10, again contained eleven samples totaling 691 grams and used the same boat as runs W5979-20 and W5979-23. The sintering cycle for this run also had a hold at 1870° C. for 3 hours. However, the nitrogen pressure was dropped from 200 to 50 psig just as peak pressure was reached. The system was immediately repressurized with nitrogen to 200 psi. This procedure was repeated at the end of the first and again at the end of the second hour at 1870° C. The venting process took about 5 minutes to reach 50 psi and another 10 minutes to repressurize to 200 psi.

Table III shows the dramatic improvement in density achieved using the present invention. Also of note is the ability of this technique to provide a uniform high density in the parts while maintaining a significantly lower weight loss than that observed in the partially filled boat (Table I).

TABLE III

RESULTS OF SINTERING RUN W6027-10

| Sample Number | Sintered Density (gm/cc) | % TD* | Weight Loss % |
|---|---|---|---|
| 73 | 3.239 | 99.3 | .80 |
| 74 | 3.240 | 99.3 | .88 |
| 75 | 3.239 | 99.3 | .89 |
| 76 | 3.238 | 99.3 | .75 |
| 77 | 3.237 | 99.2 | .62 |
| 86 | 3.233 | 99.1 | .69 |
| 87 | 3.235 | 99.1 | .86 |
| 88 | 3.236 | 99.2 | 1.16 |
| 89 | 3.236 | 99.2 | 1.10 |
| 90 | 3.234 | 99.2 | .79 |
| 91 | 3.234 | 99.2 | .96 |

*Theoretical density by rule-of-mixtures is 3.26 gm/cc.

In summary a technique has been developed to effectively purge sintering inhibiting gases from covered boats by using a periodic pressure drop followed by repressurization. The technique allows fully loaded covered containers (boats) of silicon nitride parts such as AY6 parts to be sintered reproducibly to high density while minimizing weight loss.

While there has been shown and described what is at present considered the preferred embodiment of the invention, it will be obvious to those skilled in the art that various changes and modifications may be made therein without departing from the scope of the invention as defined by the appended claims.

What is claimed is:

1. A process for sintering a silicon nitride article to a density greater than 98% of theoretical comprising the following steps:

(1) heating in a protective atmosphere under a pressure a silicon nitride article containing sintering aids having a liquidus temperature in a covered container to a temperature equal to or greater than the liquidus temperature of the sintering aids contained in said silicon nitride article;

(2) sintering the silicon nitride article from step (1) at the temperature obtained from step (1) for a period sufficient to obtain a density equal to or greater than 98% of theoretical density in said protective atmosphere at said pressure to form a sintered silicon nitride article;

(3) changing said pressure of step (2) sufficiently to displace greater than one quarter by volume of said protective atmosphere in said covered container, said changing of said pressure of step (2) having a minimum pressure, said minimum pressure during said changing of said pressure being sufficient to minimize weight loss of said silicon nitride article during said period of said sintering in step (2); and (4) cooling the product from step (3) to room temperature and reducing the pressure of step (3) to atmospheric.

2. A process in accordance with claim 1 wherein step (3) comprises changing the pressure from step (2) from about 200 psig to about 50 psig and back to about 200 psig.

3. A process in accordance with claim 1 wherein said pressure in steps (1) and (2) consists essentially of about 200 psig.

4. A process in accordance with claim 1 wherein said protective atmosphere consists essentially of nitrogen.

5. A process in accordance with claim 1 wherein said sintering aids are selected from the group consisting of MgO, $Y_2O_3$, $Al_2O_3$, $ZrO_2$, $HfO_2$, $CeO_2$, $La_2O_3$ and mixtures thereof.

6. A process in accordance with claim 1 wherein step (3) comprises changing the pressure from step (2) a sufficient number of times to displace greater than one quarter by volume of said protective atmosphere in said covered container.

* * * * *